US009195060B2

(12) United States Patent
Mori et al.

(10) Patent No.: US 9,195,060 B2
(45) Date of Patent: Nov. 24, 2015

(54) DEFLECTOR, OPTICAL SCANNER, AND SCANNING DISTANCE MEASURING EQUIPMENT

(71) Applicant: HOKUYO AUTOMATIC CO., LTD., Osaka (JP)

(72) Inventors: Toshihiro Mori, Takatsuki (JP); Norihiro Asada, Osaka (JP); Kazuo Takai, Sakai (JP)

(73) Assignee: HOKUYO AUTOMATIC CO., LTD., Osaka (JP)

( * ) Notice: Subject to any disclaimer, the term of this patent is extended or adjusted under 35 U.S.C. 154(b) by 335 days.

(21) Appl. No.: 13/775,927

(22) Filed: Feb. 25, 2013

(65) Prior Publication Data
US 2014/0151535 A1 Jun. 5, 2014

(30) Foreign Application Priority Data

Dec. 3, 2012 (JP) ................................. 2012-263937

(51) Int. Cl.
*H01J 3/14* (2006.01)
*G02B 26/10* (2006.01)
*G01S 17/42* (2006.01)
*G01S 7/481* (2006.01)
*G02B 26/08* (2006.01)

(52) U.S. Cl.
CPC ............. *G02B 26/101* (2013.01); *G01S 7/4817* (2013.01); *G01S 17/42* (2013.01); *G02B 26/085* (2013.01)

(58) Field of Classification Search
CPC .................................................. G02B 26/085

USPC .................................................. 250/234, 235
See application file for complete search history.

(56) References Cited

U.S. PATENT DOCUMENTS

| 2010/0079745 | A1 | 4/2010 | Eno et al. |
| 2010/0182667 | A1 | 7/2010 | Ishida |
| 2010/0245849 | A1 | 9/2010 | Satzky et al. |
| 2011/0019252 | A1 | 1/2011 | Fujii et al. |
| 2011/0101202 | A1 | 5/2011 | Mizutani |

(Continued)

FOREIGN PATENT DOCUMENTS

| DE | 10 2009 049 809 A1 | 6/2011 |
| EP | 2 237 065 A1 | 10/2010 |
| JP | A-60-12527 | 1/1985 |

(Continued)

OTHER PUBLICATIONS

Feb. 17, 2014 Extended European Search Report issued in European Patent Application No. 13193378.0.

*Primary Examiner* — Thanh Luu
(74) *Attorney, Agent, or Firm* — Oliff PLC

(57) ABSTRACT

Scanning distance measuring equipment includes a light emitter/receiver and a deflector for deflecting and reflecting measurement light emitted from the light emitter/receiver to outside through an optical window. The deflector is provided with a first deflection mechanism including a movable unit swingable about a first axis and a drive unit for driving to swing the movable unit; a second deflection mechanism for driving to rotate the first deflection mechanism about a second axis perpendicular to the first axis; and a contactless power supply unit including a second coil that is located to rotate about the second axis along with the rotating second deflection mechanism, and a first coil that is located to face the second coil on a common axis.

9 Claims, 15 Drawing Sheets

(56) References Cited

U.S. PATENT DOCUMENTS

2011/0128162 A1 6/2011 Klepsvik
2011/0235018 A1* 9/2011 Mori et al. .................. 356/5.01

FOREIGN PATENT DOCUMENTS

| JP | A-2001-50723 | 2/2001 |
| JP | A-2003-287693 | 10/2003 |

* cited by examiner

Reflected light    Reflected light

Measurement light

DEFLECTOR, OPTICAL SCANNER, AND SCANNING DISTANCE MEASURING EQUIPMENT

This application is based on applications No. 2012-263937 filed in Japan, the contents of which are hereby incorporated by reference.

BACKGROUND OF THE INVENTION

1. Field of the Invention

The present invention relates to a deflector, an optical scanner, and scanning distance measuring equipment, which are used for three-dimensionally scanning measurement light, for example.

2. Description of the related art

Japanese Unexamined Patent Publication No. S60-12527 discloses an infrared beam scanner that includes a gear mechanism supporting a mirror so as to swing about a horizontal axis, and a motor for driving a light emitter/receiver provided at a support shaft to rotate about a vertical axis. The motor is driven to rotate the mirror about the support shaft, the posture of the mirror is changed by the gear mechanism associated with the motor, and a light beam outputted from the light emitter/receiver is reflected by the mirror and scanned three-dimensionally.

Japanese Unexamined Patent Publication No. 2001-50723 discloses a distance measuring device according to the TOF system, including a motor for vertical deflection, supporting a mirror to swing about a horizontal axis, and a motor for horizontal deflection, driving the mirror to rotate about a vertical axis.

Japanese Unexamined Patent Publication No. 2003-287693 discloses a light beam scanning mechanism that includes a motor for rotating, about a vertical axis, a mirror provided with a ferromagnetic body or a permanent magnet and an electromagnet for deflecting the mirror about a horizontal axis.

However, the infrared beam scanner disclosed in Japanese Unexamined Patent Publication No. S60-12527 adopts a mechanical swing mechanism for swinging the mirror about the horizontal axis by means of the gear mechanism. Therefore, the mirror cannot be swung at high speed, and the swing angle thereof cannot be controlled precisely, which lead to poor measurement accuracy. There is another problem that the device fails to be decreased in size.

In the distance measuring device disclosed in Japanese Unexamined Patent Publication No. 2001-50723, the mirror is driven by the motor for vertical deflection. Therefore, the mirror cannot be swung at high speed, and the device fails to be decreased in size.

The distance measuring device disclosed in Japanese Unexamined Patent Publication No. 2003-287693 is driven by the electromagnet, which requires the special mirror provided with the ferromagnetic body or the permanent magnet and increases the cost. Furthermore, the distance measuring device cannot be driven at high speed and fails to be decreased in size.

In each of the devices disclosed in Japanese Unexamined Patent Publications Nos. 2001-50723 and 2003-287693, the mirror rotating about the vertical axis is swung by the motor for rotating about the horizontal axis or the electromagnet. In order to input a driving electrical signal to the motor for rotating about the horizontal axis or the electromagnet, a slider structure for signal transmission needs to be provided to a vertical rotary shaft of the mirror or the like. Therefore, the life of the device is shortened due to mechanical abrasion at portions in contact with each other.

SUMMARY OF THE INVENTION

In view of the problems mentioned above, it is an object of the present invention to provide a deflector, an optical scanner, and scanning distance measuring equipment, which enable contactless transmission of signals from outside to a swinging portion, as well as are small and lightweight.

In order to achieve the object mentioned above, a deflector according to the present invention includes: a first deflection mechanism including a movable unit swingable about a first axis and a drive unit for driving to swing the movable unit; a second deflection mechanism for driving to rotate the first deflection mechanism about a second axis different from the first axis; and a contactless power supply unit including a second coil that is electrically connected to the drive unit and is located to rotate about the second axis along with the rotating second deflection mechanism, and a first coil that is located to face the second coil on a common axis, the contactless power supply unit for supplying power from the first coil to the second coil in accordance with an electromagnetic induction system.

Preferably, the first deflection mechanism includes a fixed unit rotatably supported by the second deflection mechanism, and a beam with which the movable unit is supported by the fixed unit, and the beam is driven by the drive unit to twist rotate or warp swing, and serves as the first axis.

Preferably, there are further included: a light emitter/receiver located on the second axis; a light deflecting unit provided at the movable unit, for deflecting and reflecting measurement light emitted from the light emitter/receiver along the second axis and guiding, to the light emitter/receiver, light reflected by an object out of the measurement light thus deflected and reflected; a reference reflection member irradiated with the measurement light emitted from the light emitter/receiver and deflected and reflected by the light deflecting unit; and a swing controller for controlling the drive unit in accordance with reflected light from the reference reflection member and received by the light emitter/receiver; wherein a control signal is transmitted from the swing controller to the drive unit by way of the contactless power supply unit.

Preferably, the reference reflection member includes regions of different reflectance along the second axis, and the swing controller includes an amplitude detector for detecting swing amplitude by the first deflection mechanism in accordance with the reflected light from the reference reflection member and received by the light emitter/receiver, and an amplitude controller for controlling the drive unit such that the swing amplitude detected by the amplitude detector has a predetermined value.

Preferably, the drive unit includes a driving coil provided at the movable unit, and the amplitude controller controls a frequency of current applied to the coil by way of the contactless power supply unit.

Preferably, the drive unit includes a driving coil provided at the movable unit, and a power supply circuit for generating current applied to the coil, the amplitude controller transmits, to the power supply circuit, frequency control information on current applied to the coil by way of the contactless power supply unit, the frequency control information being superposed on a high frequency current of contactless power supply unit, and the power supply circuit controls the frequency of the current applied to the coil in accordance with the frequency control information.

More preferably, there is further included: a synchronization controller for adjusting a rotation cycle of the second deflection mechanism and/or a measurement cycle by measurement light emitted from the light emitter/receiver, in synchronization with a swing cycle of the movable unit.

More preferably, there is further included: a light controller for adjusting intensity or an emission interval of measurement light emitted from the light emitter/receiver, in accordance with the reflected light from the reference reflection member and received by the light emitter/receiver.

Preferably, the contactless power supply unit includes paired coil support units each having a ring shape, supporting the first coil and second coil respectively wound therearound, and a contactless signal transmission unit for transmitting/receiving a signal from/to the first deflection mechanism is provided in a space formed at a center of each of the coil support units.

The characteristics and the configurations of the optical scanner, the deflector, and the scanning distance measuring equipment according to the present invention will be clearly described with reference to the following examples.

DESCRIPTION OF THE PREFERRED EMBODIMENTS

Described below with reference to the drawings is scanning distance measuring equipment including a deflector according to the present invention.

Figure 3A:
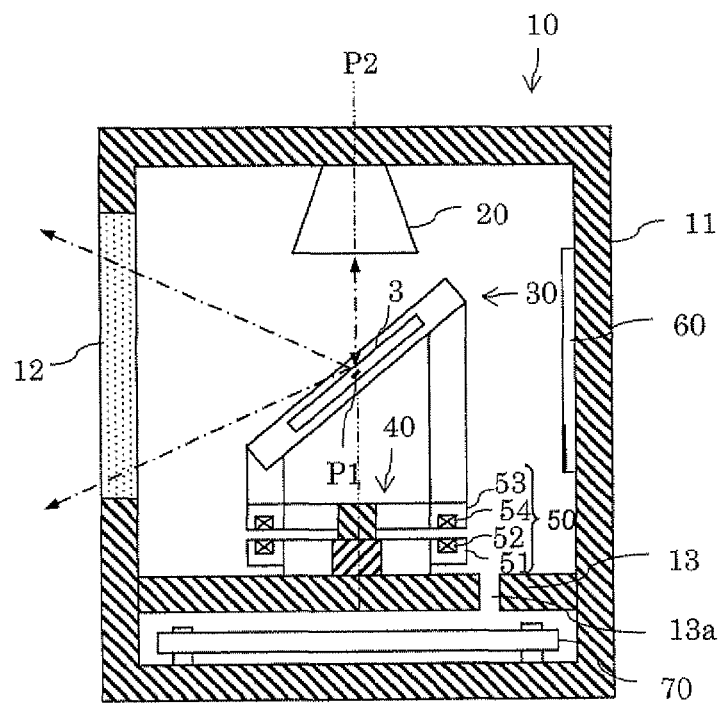
FIG. 3A is a sectional view of the deflector according to the present invention.
Figure 3B:
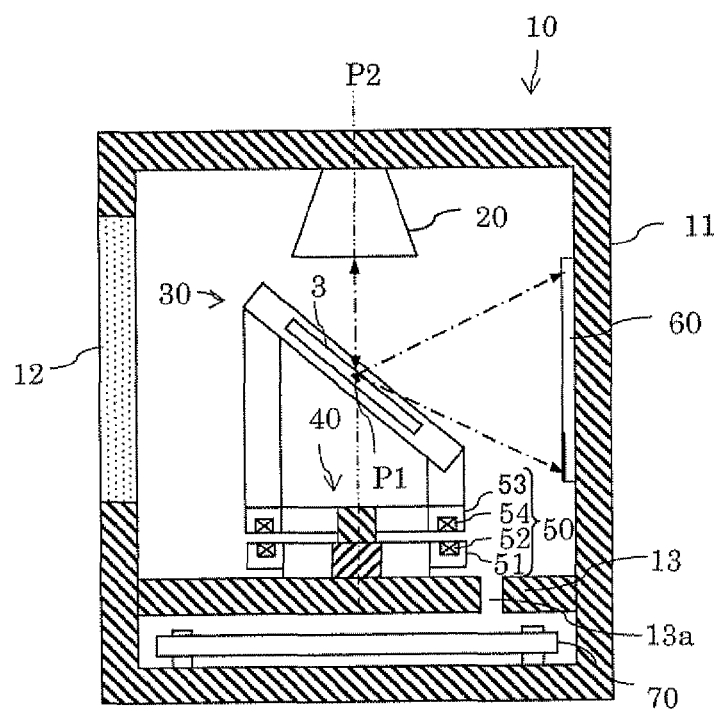
FIG. 3B is a sectional view of the deflector according to the present invention.

FIGS. 3A and 3B each show scanning distance measuring equipment 10 according to the present invention. The scanning distance measuring equipment 10 adopts the TOF system, and includes a cylindrical casing 11 provided with an optical window 12, a light emitter/receiver 20 accommodated in the casing 11, a first deflection mechanism 30, a second deflection mechanism 40, a contactless power supply unit 50, a signal processing unit 70, and the like.

The first deflection mechanism 30 includes a movable unit 3 that is swingable about a first axis P1 perpendicular to the direction of the sheet of FIG. 3A, and a drive unit (not shown) for driving to swing the movable unit 3. The second deflection mechanism 40 is driven to rotate the first deflection mechanism 30 about a second axis P2 that is different from the first axis P1 and is parallel to the direction of the sheet of FIG. 3A.

The contactless power supply unit 50 includes a first coil 52 and a second coil 54 that are located so as to face each other with a slight gap being provided therebetween. The second coil 54 is electrically connected to the drive unit of the first deflection mechanism 30, and is located to rotate about the second axis P2 along with the rotating second deflection mechanism 40. The first coil 52 is located to face the second coil 54 on the common axis P2. Power is supplied in accordance with the electromagnetic induction system such that alternating current applied to the first coil 52 generates electromotive force at the second coil 54.

When current is flown to the first coil facing the second coil, electromotive force is generated at the second coil facing the first coil by electromagnetic induction. It is thus possible to supply power from the second coil to the drive unit of the first deflection mechanism that rotates about the second axis along with the second coil. Because power is supplied contactlessly from the first coil to the second coil, there is no need to adopt a slider structure that has limited mechanical life.

The first axis P1 and the second axis P2 are located so as to be perpendicular to each other. The stopped movable unit 3 has a flat surface that is inclined at 45° from a plane perpendicular to the second axis P2. The deflector according to the present invention is configured by the first deflection mechanism 30, the second deflection mechanism 40, and the contactless power supply unit 50. The second axis P2 also serves as the axis of the casing 11.

The respective portions will be described in detail below.

Figure 1:
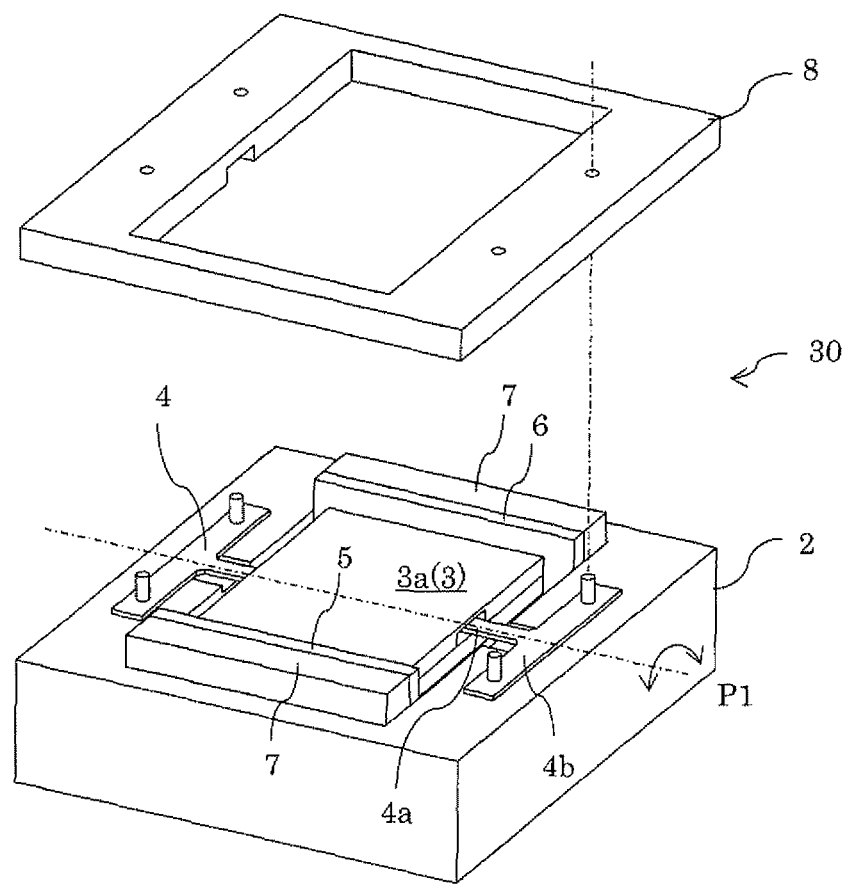
FIG. 1 is a perspective view of a miniature machine configuring a main portion of a deflector according to the present invention.
Figure 2:
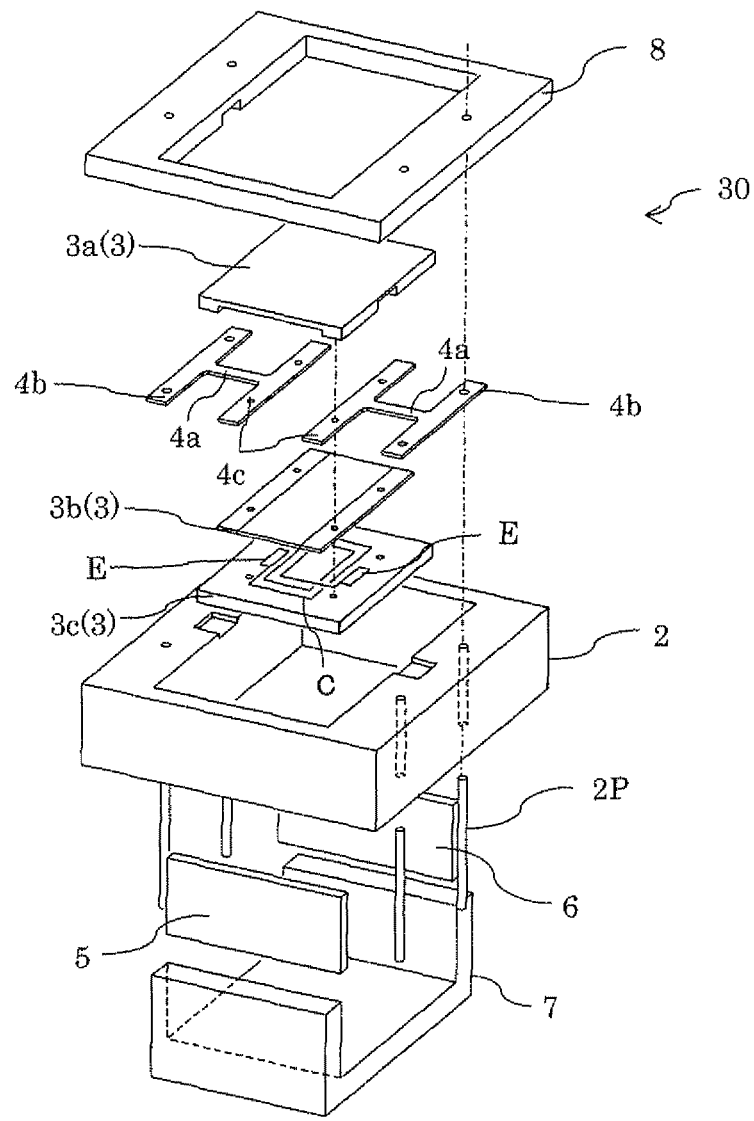
FIG. 2 is an exploded perspective view of the miniature machine.

As shown in FIGS. 1 and 2, the first deflection mechanism 30 includes a frame serving as a fixed unit 2, a flat plate body serving as the movable unit 3, paired beams 4, 4 that support the movable unit 3 so as to be swingable about the first axis P1 with respect to the fixed unit 2, permanent magnets 5 and 6 that are located at the respective ends of the movable unit 3 with the beams 4, 4 being sandwiched therebetween, an upper cover 8, and the like.

The fixed unit 2 is configured by a rectangular parallelepiped member made of resin such as polycarbonate, has a center portion that is slightly larger in area in planar view than the movable unit 3 and is provided with an open space that is hollowed along the thickness. The movable unit 3 is located in the open space.

The beams 4, 4 are configured by elastic members made of metal, and each include a metal bar 4a having a predetermined length, a fixed unit pad 4b that is provided at a first end of the metal bar 4a and is fixed to the fixed unit 2, and a movable unit pad 4c that is provided at a second end of the metal bar 4a and is fixed to the movable unit 3.

The permanent magnets 5 and 6 are located to face each other in a magnetic retainer 7 having a U shape in cross section and configured by a member having high magnetic permeability, such that the magnet 5 serves as the north pole and the magnet 6 serves as the south pole. These permanent magnets 5 and 6 are inserted from below and are fixed into the open space in the fixed unit 2 so as to have the movable unit 3 sandwiched therebetween.

The movable unit 3 includes a deflecting mirror 3a that is configured by a glass substrate or a silicon substrate with gold, aluminum, or the like being deposited thereonto, a coil substrate 3c that is configured by a glass epoxy substrate with a copper wire coil C and electrode pads E being printed thereon, and a spacer 3b that is also made of glass epoxy and is interposed therebetween.

The movable unit pads 4c of the paired beams 4, 4 are positioned so as to be in contact with the electrode pads E, respectively, and are bonded and fixed between the deflecting mirror 3a and the coil substrate 3c by a conductive adhesive agent. Alternatively, the coil substrate 3c may be configured by a multiple layered substrate having substrate layers that are made of epoxy resin or the like, and are provided respectively with coil patterns and coils coupled together by means of a via.

When alternating current is applied to the driving coil C by way of the paired beams 4, 4, the alternating current flowing to the coil C and a magnetic field formed by the permanent magnets 5 and 6 provided at the fixed unit 2 generate Lorentz force applied to the coil C, and the movable unit 3 supported by the beams 4, 4 are repetitively swung by the Lorentz force. The drive unit is configured by the coil substrate 3c and the permanent magnets 5 and 6.

More specifically, the first deflection mechanism 30 includes at least one movable unit 3, the fixed unit 2, and the paired beams 4, 4 supporting the movable unit 3 at the respective ends with respect to the fixed unit 2. The movable unit 3 is configured to be swingable about the first axis P1 with the beams 4 serving as twist rotary axes.

The beams 4, 4 each serve as a supporter of the movable unit 3, a conductor for flowing current to the coil C, and a spring for returning the movable unit 3 to a reference position. The movable unit 3 is further provided with a light deflecting surface (deflecting mirror) 3a for reflecting incident light to deflect and scan the reflected light.

The material for the beams 4, 4 is not limited to metal, but may be any material such as silicon or resin, which can be processed in accordance with the MEMS technique, and is appropriately selected depending on a target swing frequency.

In the first deflection mechanism, the movable unit is supported by the fixed unit with the beams, which are driven to be twist rotated by the drive unit, being interposed therebetween. In the first deflection mechanism, the beams serve as twist beams in a gimbal structure, can be made significantly compact and lightweight in accordance with the MEMS (Micro Electro Mechanical Systems) technique or the like, and can be driven to swing at high speed.

For example, the movable unit is provided with the flat coil, and alternating current flowing to the coil and the magnetic field formed by the permanent magnets provided at the fixed unit generate Lorentz force to be applied to the coil. As a result, the movable unit supported by the beams is swung repetitively.

In addition to the case where the movable unit is swung by Lorentz force, there is also proposed a miniature machine in which a movable unit is swung by electrostatic force that is generated by alternating current applied to a coil or piezoelectric force that is generated by voltage applied to a piezoelectric body, or a miniature machine in which a movable unit supported by a cantilever is driven to warp swing back and forth. With use of such a miniature machine, it is possible to achieve a deflector that is compact, lightweight, and of high speed.

Figure 5A:
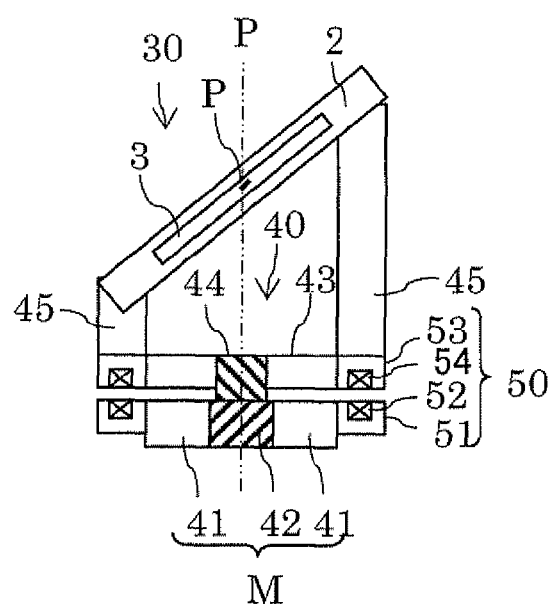
FIG. 5A is a sectional view of a first deflection mechanism.

As shown in FIG. 5A, the second deflection mechanism 40 includes a motor M that is provided with a stator 41 having a coil and a rotor 42 having a permanent magnet, a rotary shaft 44 coupled to the rotor 42, a discoidal support unit 43 integrally coupled with the rotary shaft 44, and a cylindrical support unit 45 provided to surround the support unit 43. The support units 43 and 45 rotatably support the fixed unit 2 of the first deflection mechanism 30.

The first deflection mechanism 30 coupled to the support units 43 and 45 is driven by the motor M to rotate about the second axis P2. The rotary shaft 44 is provided with an encoder, of which output is received by the signal processing unit 70. The signal processing unit 70 obtains rotation speed and rotational displacement (a rotational phase) of the rotary shaft 44. It is possible to preferably adopt a DC brushless motor or a stepping motor as the motor M.

Figure 5B:
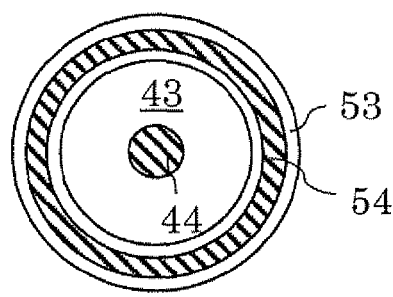
FIG. 5B is a plan view of a contactless power supply unit (second coil)
Figure 5C:
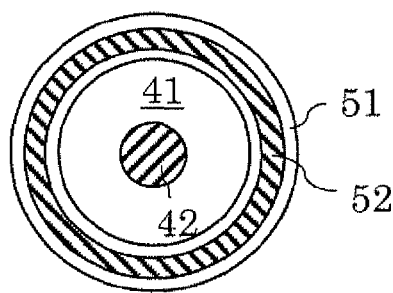
FIG. 5C is a plan view of the contactless power supply unit (first coil)

As shown in FIGS. 5A, 5B, and 5C, the contactless power supply unit 50 includes paired coil support units 51 and 53 each of which is made of silicon steel and has a ring shape, and copper wire coils 52 and 54 that are wound along annular grooves having U shapes in cross section and provided in first end surfaces of the coil support units 51 and 53, respectively.

The first coil support unit 51 and the second coil support unit 53 are located around the second axis P2 with a slight gap being provided therebetween such that the respective grooves face each other. Power is supplied from the first coil 52 to the second coil 54 in accordance with the electromagnetic induction system.

The first coil support unit 51 is fitted and fixed around the stator 41 for the purpose of space saving, at a height so as to be flush with the stator 41. The second coil support unit 53 is fitted and fixed around the discoidal support unit 43, and the gap between the first and second coil support units 51 and 53 are defined by the length of the rotary shaft 44.

Alternating current of a predetermined frequency, used for driving to swing the movable unit 3, is generated at the signal processing unit 70 and is applied to the first coil 52. The alternating current is electromagnetically induced to the second coil 54 that is rotated relatively to the first coil 52, and is applied to the coil C provided at the coil substrate 3c that rotates integrally with the second coil 54. As a result, the movable unit 3 is swung about the first axis P1.

The signal processing unit 70 is provided on the bottom surface of the casing 11, and the deflector is set on a support plate 13 that is provided above the signal processing unit 70. The support plate 13 is provided with a bore 13a, which is opened to provide signal wire between the signal processing unit 70 and the first coil 52 or the light emitter/receiver 20.

The signal processing unit 70 is configured by an electronic circuit having a microcomputer and the like, and at least includes a control block for the first deflection mechanism 30, a control block for the second deflection mechanism 40, a control block for the light emitter/receiver 20, and an operation block for distance measurement operations.

Figure 4A:
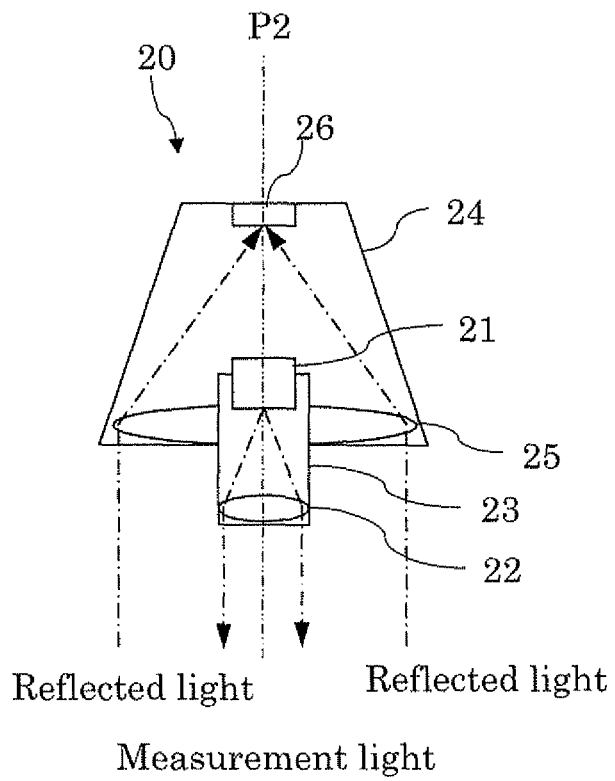
FIG. 4A is an explanatory view of a light emitter/receiver.

FIG. 4A shows the configuration of the light emitter/receiver 20. The light emitter/receiver 20 includes a laser diode 21 serving as a light source, an avalanche photodiode 26 serving as a light receiver, and the like.

Measurement light radiated from the laser diode 21 is guided to a collimator lens 22. The measurement light parallelized by the collimator lens 22 is incident, along the axis P2, to the deflecting mirror 3a (see FIG. 4B) of the first deflection mechanism 30. The collimator lens 22 is accommodated in an optical guide member 23, which is accommodated in a camera obscura 24 having a circular truncated cone shape.

The camera obscura 24 has an open lower end, and a condenser lens 25 is provided to surround the optical guide member 23. The avalanche photodiode 26 is located at the ceiling of the camera obscura 24 and right above the optical guide member 23. Reflected light from the first deflection mechanism 30 is incident along the second axis P2, is condensed by the condenser lens 25, and is incident to the avalanche photodiode 26 for photoelectric conversion.

Figure 4B:
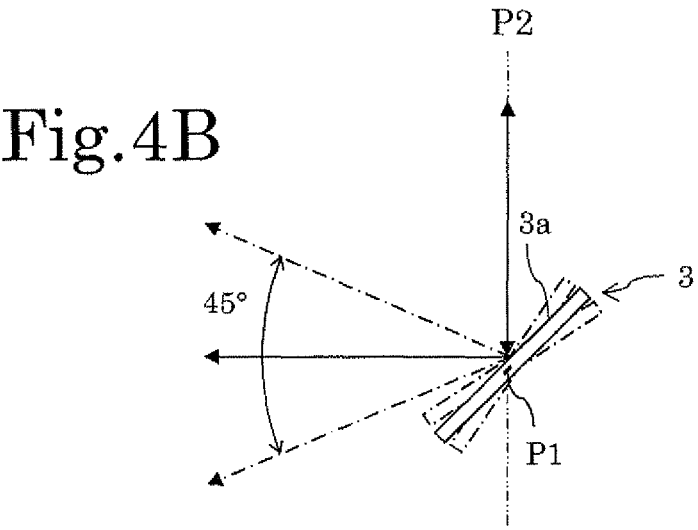
FIG. 4B is an explanatory view of measurement light that is scanned by a movable unit swung about a first axis.

FIG. 4B shows a state where measurement light emitted from the light emitter/receiver 20 is deflected and reflected upward and downward by the deflecting mirror 3a that is driven by the drive units 3c, 5, and 6 so as to be swung about the first axis P1. In this example, the deflecting mirror 3a is swung at mechanical angles ±11.25°, so that measurement light is deflected and reflected in the range of ±22.5° (45°).

The measurement light deflected and reflected by the deflecting mirror 3a is emitted through the optical window 12 of the casing 11 to an outer space. The emitted light is reflected by an object in the outer space and is then deflected and reflected by the deflecting mirror 3a to the light emitter/receiver 20, so as to be detected by the avalanche photodiode 26 serving as the light receiver.

The signal processing unit 70 includes a distance measurement operation unit, which obtains a time difference between emission timing of measurement light and receipt timing of reflected light. The distance from the scanning distance measuring equipment 10 to the object is calculated from the time difference.

The deflecting mirror 3a is driven to be swung about the first axis P1, and is driven by the second deflection mechanism 40 to rotate about the second axis P2. As a result, measurement light is scanned two-dimensionally.

Figure 6:
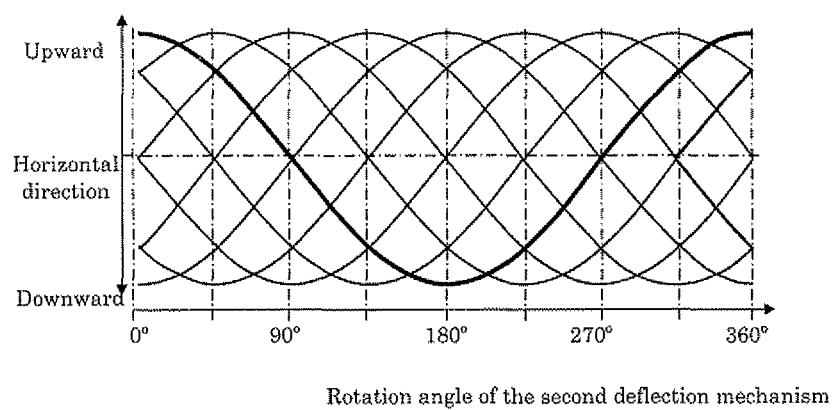
FIG. 6 is an explanatory view indicating tracks of measurement light emitted into a three-dimensional space from scanning distance measuring equipment according to the present invention.

FIG. 6 exemplifies tracks of measurement light continuously lighted, in a case where the swing cycle of the deflecting mirror 3a about the first axis P1 is matched with the rotation cycle of the deflecting mirror 3a about the second axis P2.

If relative phases are shifted between the respective cycles, the tracks of measurement light are shifted accordingly. These tracks form a Lissajous shape. Actually, the swing cycle of the deflecting mirror 3a is set to a value larger by at least one digit than that of the rotation cycle, and the light source is driven to be switched on and off at a cycle of a value larger by one to two digits than the swing cycle.

In order to swing the deflecting mirror 3a with sufficient amplitude, the frequency of alternating current applied to the coil C is usually set to be approximate to the resonant frequency of the beams 4, 4 as well as of the movable unit 3. However, if the resonant frequency of the beams 4, 4 as well as of the movable unit 3 is varied due to variation in temperature and so forth, the movable unit 3 has swing amplitude varied accordingly.

In order to keep the swing amplitude constant, it is necessary to measure variation in swing amplitude so as to control current applied to the coil C. If the first deflection mechanism 30 is provided with a sensor for measuring swing amplitude of the movable unit 3, it is necessary to provide an additional coil according to the electromagnetic induction system in order to transmit an output signal of the sensor from the first deflection mechanism 30 to the signal processing unit 70, which lead to increase in cost.

Figure 7A:
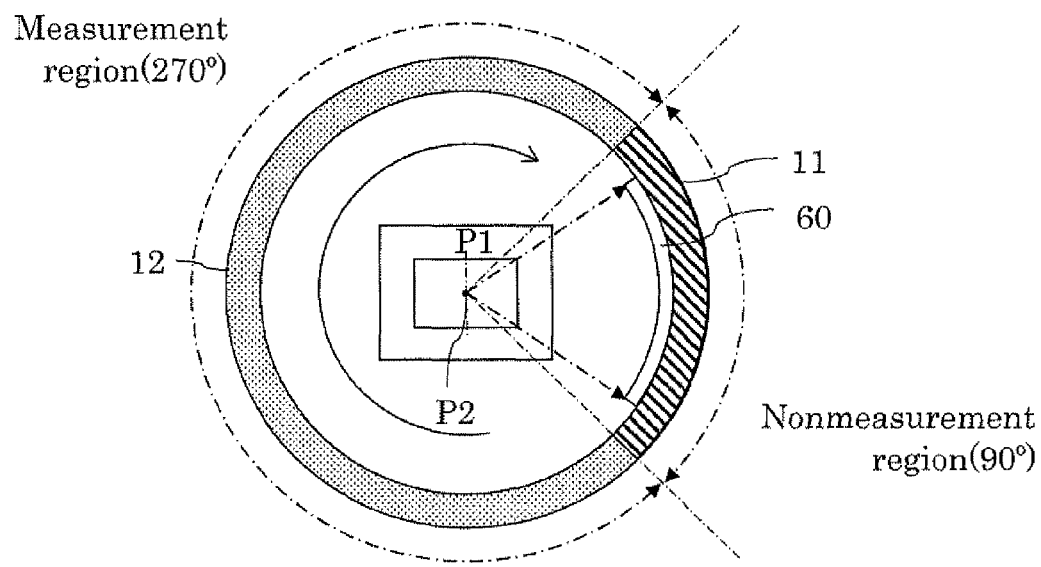
FIG. 7A is an explanatory view of scanning measurement light applied to a reference reflection member.

Instead thereof, as shown in FIGS. 3A, 3B, and 7A, there is provided a reference reflection member 60 so as to be along an inner peripheral surface of the casing 11 in a region not provided with the optical window 12. The reference reflection member 60 reflects measurement light that is deflected and reflected by the deflecting mirror 3a. In this example, a measurement region is set in the range of 270° about the second axis P2, where the optical window 12 is provided. A nonmeasurement region is set in the range of remaining 90°, where the reference reflection member 60 is located partially.

Figure 7B:
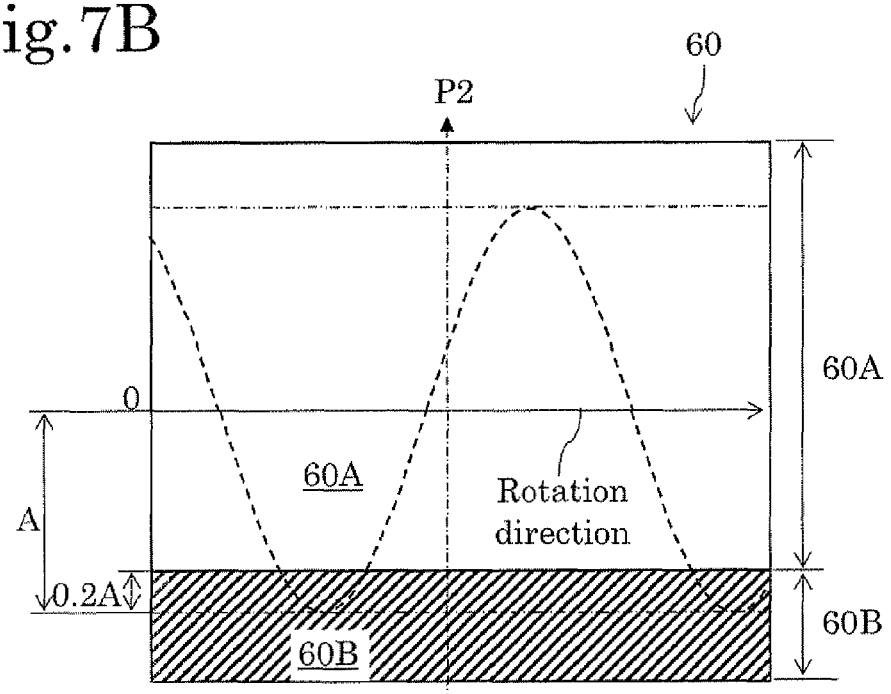
FIG. 7B is an explanatory view of a track of measurement light.

FIG. 7B illustrates the reference reflection member 60 that is extended to be flat. In this diagram, a sine wave drawn by a broken line indicates a track of measurement light, and the light source is switched on and off at a predetermined cycles along the track. The reference reflection member 60 is configured by a reflection sheet that has a length along the second axis P2 slightly longer than target amplitude A corresponding to target swing amplitude of the deflecting mirror 3a. The reference reflection member 60 is positioned and fixed to the inner wall of the casing 11 such that measurement light passes through the vertical center when the deflecting mirror 3a is stopped.

The reference reflection member 60 is provided at a lower edge thereof with a low reflectance region 60B that has a reflectance lower than that of a remaining region (high reflectance region) 60A. The low reflectance region 60B has a width at least covering 20% of the target amplitude A from the lower edge.

Figure 8:
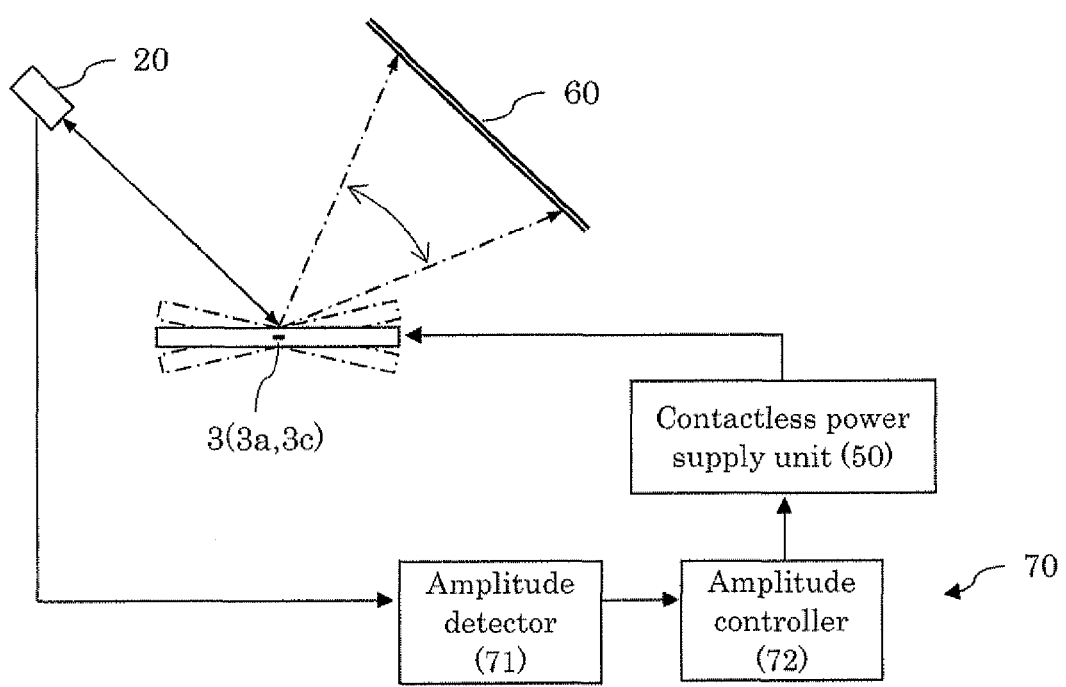
FIG. 8 is an explanatory view of a swing control device for controlling to swing the movable unit.

As shown in FIG. 8, the signal processing unit 70 includes a swing controller that is provided with an amplitude detector 71 and an amplitude controller 72. Reflected light from the reference reflection member 60 is detected by the light emitter/receiver 20, and is transmitted by way of the signal wire to the amplitude detector 71 for detection of amplitude.

The amplitude detected by the amplitude detector 71 is transmitted to the amplitude controller 72, and the frequency is adjusted while the current value of alternating current is kept constant so that the amplitude is set to a target value. An alternating signal outputted from the amplitude controller 72 is transmitted by way of the contactless power supply unit 50 and is applied to the coil C of the movable unit 3.

The amplitude detector 71 detects, as one cycle of the movable unit, a total time length of a detection interval corresponding to the low reflectance region 60B and a detection interval corresponding to the high reflectance region 60A. More specifically, the amplitude detector 71 includes a comparator for binarizing reflected light from the reference reflection member 60 with a predetermined threshold, a timer circuit for counting a time length of each section with use of a signal edge detected by the comparator as a trigger, a storage unit for storing values of the timer circuit, and the like.

Figure 9:
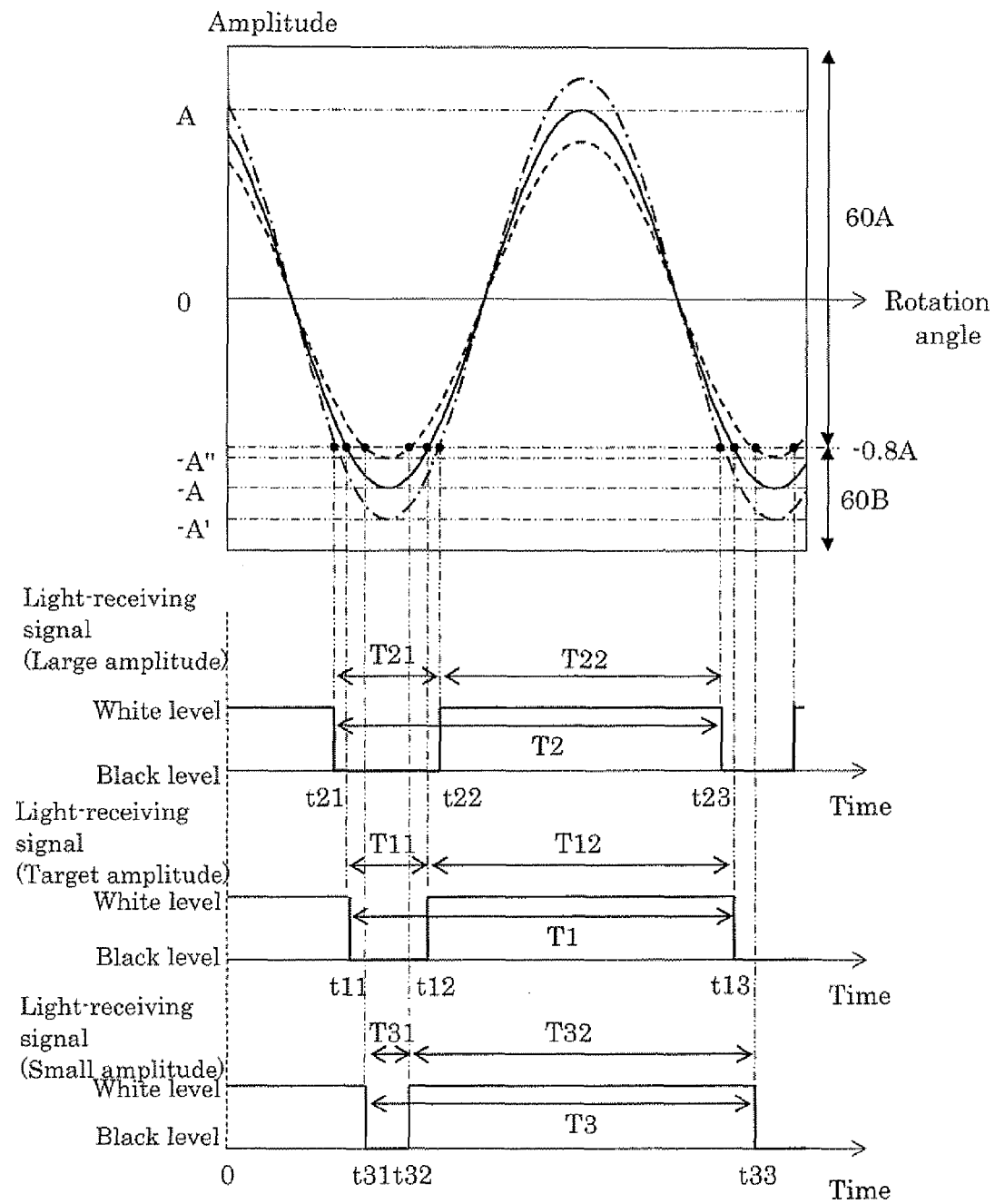
FIG. 9 is an explanatory view of the relationship between variation in swing amplitude of the movable unit and the reference reflection member.

FIG. 9 indicates, in the upper portion, a relationship between the reference reflection member 60 and an amplitude characteristic curve (solid line) in a case where the deflecting mirror 3a (the movable unit 3) has target amplitude −A (with a swing angle of −11.25°), an amplitude characteristic curve (broken line) in a case where the deflecting mirror has amplitude −A' larger than the target amplitude −A (with a swing angle being larger than −11.25°), and an amplitude characteristic curve (dashed line) in a case where the deflecting mirror has amplitude A" smaller than the target amplitude −A (with a swing angle being smaller than −11.25°), respectively.

FIG. 9 indicates, in the lower portion, timing of detection, by the light emitter/receiver 20, of reflected light from the reference reflection member 60. The movable unit 3 is ideally preferred to be continuously swung at the target amplitude ±A. However, the amplitude is varied from the target amplitude ±A when the resonant frequency of the beams 4, 4 as well as of the movable unit 3 is varied due to variation in environmental temperature and the like. If the resonant frequency is close to the frequency of the current applied to the coil C, the amplitude of the movable unit 3 is increased. On the other hand, if the resonant frequency is far from the frequency of the current applied to the coil C, the amplitude of the movable unit 3 is decreased.

When the movable unit 3 has the target amplitude ±A, the amplitude detector 71 detects a section T11 of a black level region corresponding to the low reflectance region 60B, and a section T12 of a white level region corresponding to the high reflectance region 60A. A total time length of the section T11 and the section T12 is detected as one cycle of the movable unit 3.

When the movable unit 3 has the amplitude A' larger than the target amplitude A, the amplitude detector 71 detects a section T21 of the black level region corresponding to the low reflectance region 60B, and a section T22 of the white level region corresponding to the high reflectance region 60A. A total time length T2 (=T1) of the section T21 and the section T22 is detected as one cycle of the movable unit 3.

Similarly, when the movable unit 3 has the amplitude A" smaller than the target amplitude A, the amplitude detector 71 detects a section T31 of the black level region corresponding to the low reflectance region 60B, and a section T32 of the white level region corresponding to the high reflectance region 60A. A total time length T3 (=T1) of the section T31 and the section T32 is detected as one cycle of the movable unit 3.

When the time ratio between the section of the white level region and the section of the black level region thus detected by the amplitude detector 71 is varied from a target value (T11/T12), the amplitude controller 72 variably controls a frequency f so as to equalize the time ratio to the target value (T11/T12), while keeping constant the current value of current applied to the coil C. As a result, the amplitude of the movable unit 3 is kept constant to the target amplitude A.

By adopting the above configuration, the light emitter/receiver receives light reflected by the reference reflection member out of measurement light emitted from the light emitter/receiver, which is located outside a rotation system of the first deflection mechanism. It is therefore possible to detect swing amplitude of the movable unit in accordance with the reflected light. In other words, there is no need to extract measured swing amplitude of the movable unit out of the first deflection mechanism.

More specifically, the amplitude controller 72 includes an operation circuit for calculating a time ratio between the section of the white level region and the section of the black level region as well as a deviation between the time ratio and the target value, a feedback operation unit exemplified by a PID operation unit or the like, for calculating, from the deviation, a control value of a frequency of applied current, an alternating power supply circuit provided with a PLL circuit for adjusting the frequency of the applied current in correspondence with the control value calculated by the feedback operation unit, and the like. Keeping constant the current value of current applied to the coil C indicates keeping constant an effective value of alternating current.

More specifically, the amplitude detector 71 detects the section of the white level region and the section of the black level region with respect to the reference reflection member 60, in accordance with a rotation number and rotational displacement of the motor based on output from the encoder provided at the rotary shaft 44. The amplitude controller 72 obtains a swing frequency and amplitude of the movable unit 3 from the total time length of the section of the white level region and the section of the black level region and the time ratio therebetween.

Figure 10A:
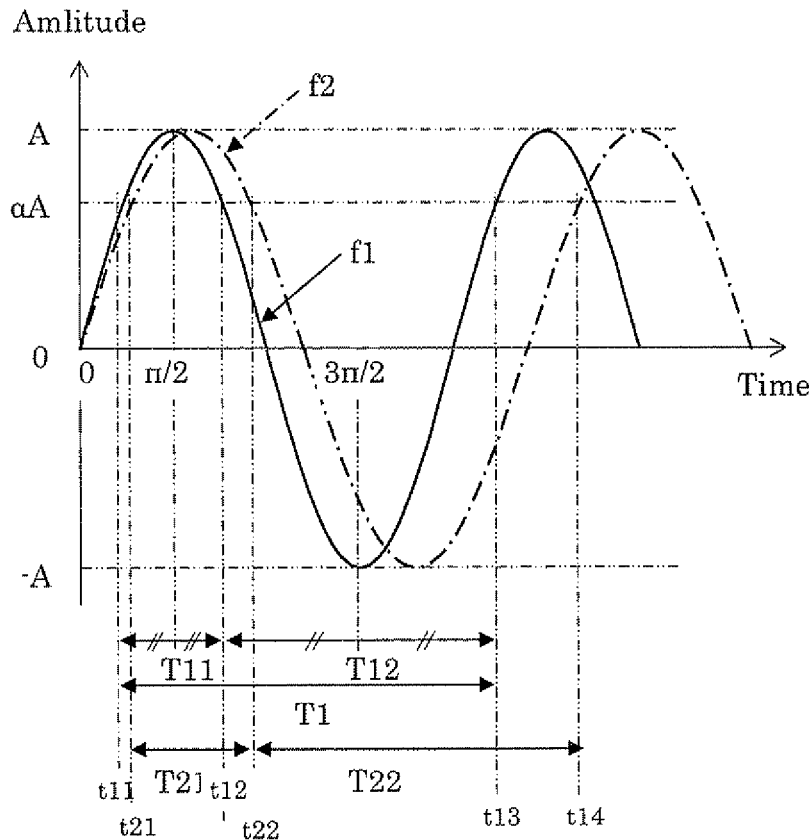
FIG. 10A is an explanatory view of a principle of swing control.

As shown in FIG. 10A, assume a case where the amplitude detector 71 detects a black level section and a white level section divided at a position of amplitude αA, for each of the movable units 3 having the same swing amplitude A and swing frequencies f1 and f2 (f1<f2), respectively.

The movable unit 3 having the swing frequency f1 is swung at A1(t)=A sin 2πf1t, while the movable unit 3 having the swing frequency f2 is swung at A2(t)=A sin 2πf2t. Timing t11, timing t12, and timing t13 of the amplitude αA are obtained by the following equations.

$$\alpha A = A \sin 2\pi f1 t$$

$$\alpha A = A \sin 2\pi f2 t$$

accordingly obtained are $$t11=\{1/(2\pi f1)\} \times \sin^{-1}(\alpha)$$

$$t12=\{1/(2\pi f1)\} \times \{\pi - \sin^{-1}(\alpha)\}$$

$$t13=\{1/(2\pi f1)\} \times \{2\pi - \sin^{-1}(\alpha)\} \text{ wherein } 0 \leq \sin^{-1}(\alpha) \leq \pi/2$$

Therefore, $$T11=t12-t11=\{1/(2\pi f1)\} \times \{\pi - 2\sin^{-1}(\alpha)\}$$

$$T12=t13-t12=\{1/(2\pi f1)\} \times \{\pi + 2\sin^{-1}(\alpha)\}$$

$$T11/T12=\{\pi - 2\sin^{-1}(\alpha)\}/\{\pi + 2\sin^{-1}(\alpha)\}$$

similarly, $$T21/T22=\{\pi - 2\sin^{-1}(\alpha)\}/\{\pi + 2\sin^{-1}(\alpha)\}$$

In summary, T1/T2 (=T11/T12=T21/T22) is constant as long as the amplitude is constant, even if the frequency is varied. To the contrary, if the frequency is adjusted so as to keep T1/T2 constant, the amplitude is kept constant.

Figure 10B:
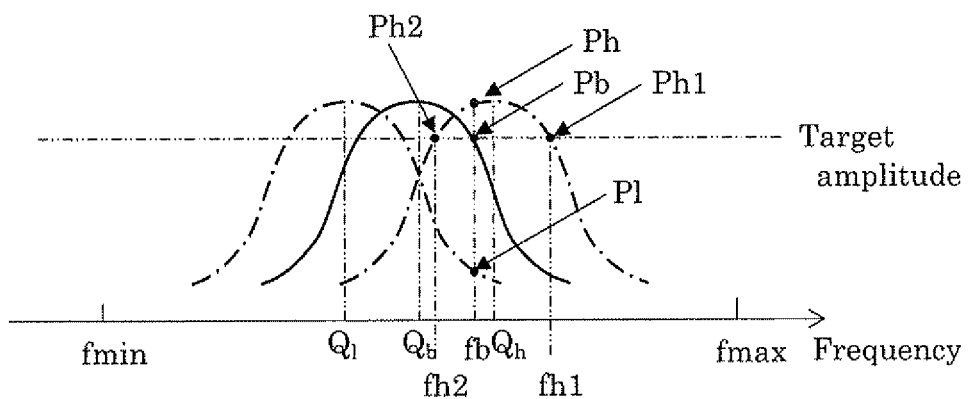
FIG. 10B is an explanatory view of frequency control on applied current relative to variation in resonant frequency.

As shown in FIG. 10B, in a case where the beams 4, 4 as well as the movable unit 3 have an initial resonant frequency Qb, the amplitude controller 72 continuously or steppedly varies the frequency of current from a frequency fmax sufficiently higher than the resonant frequency Qb to a frequency fmin sufficiently lower than the resonant frequency Qb while keep constant the current applied to the coil C at an initial stage.

The amplitude controller 72 determines whether or not the time ratio between the white level section and the black level section detected by the amplitude detector 71 is equal to the target value every time the amplitude controller 72 continuously or steppedly varies the frequency of current from a frequency fmax sufficiently higher than the resonant frequency Qb to a frequency fmin sufficiently lower than the resonant frequency Qb. If the time ratio converges into a predetermined allowable range, the amplitude controller 72 keeps the frequency (frequency fb in FIG. 10B). In FIG. 10B, the operating point of the movable unit 3 is indicated as a point Pb on the resonant characteristic of the resonant frequency Qb.

Thereafter, if the resonant frequency decreases to Q1, the operating point is shifted to a point P1 on the resonant characteristic of the resonant frequency Q1 to reduce the amplitude. On the other hand, if the resonant frequency increases to Qh, the operating point is shifted to a point Ph on the resonant characteristic of the resonant frequency Qh to increase the amplitude.

For example, if the resonant frequency is increased to Qh, the amplitude controller 72 adjusts the frequency of the current applied to the coil C to fh1 higher than the resonant frequency Qh or to fh2 lower than the resonant frequency Qh, so that the time ratio between a long cycle section and a short cycle section is equal to the target value, As a result, the movable unit 3 moves at a point Ph1 or a point Ph2 on the resonant characteristic of the resonant frequency Qh. If there is a difference in operation stability between the point Ph1 and the point Ph2, the movable unit will be adjusted to the operation point of higher operation stability.

For example, assume that the motor M provided at the second deflection mechanism 40 has rotation speed of 20 Hz and the first deflection mechanism 30 has a swing frequency of 200 Hz. In this case, the movable unit 3 is swung ten times while the motor M rotates once.

If the reference reflection member 60 is provided in the nonmeasurement region of 90° in this case, the movable unit 3 is swung at least for two cycles. It is thus possible to measure swing amplitude of two cycles for one rotation cycle of the motor M. If the light source has sufficiently short switching on/off cycles, it is possible to measure the white region and the black region at sufficient resolution.

If the swing frequency of the movable unit 3 swung by the first deflection mechanism 30 is too low relatively to the rotation speed of the motor M and the movable unit cannot be driven to be swung for at least one cycle with respect to the reference reflection member 60 while the motor M rotates once, it is impossible to measure swing amplitude of the movable unit 3 while the motor M rotates once.

However, in such a case, the storage unit stores a signal corresponding to reflected light from the reference reflection member 60 measured while the motor M of the second deflection mechanism 40 rotates for a plurality of times and rotational displacement thereof detected by the encoder. By obtaining a composite signal for one cycle in correspondence with rotational displacement detected afterwards by the encoder, it is possible to calculate swing amplitude of the movable unit 3, so as to control swing amplitude in accordance with the obtained value.

The signal processing unit 70 is preferred to further include a light controller for adjusting intensity or light emission intervals of measurement light emitted from the light emitter/receiver 20 in accordance with reflected light from the reference reflection member 60 and received by the light emitter/receiver 20.

Variation in intensity of measurement light emitted from the light emitter/receiver 20 may lead to deterioration in measurement accuracy, and intensity of laser light used by the light source may not satisfy safety standards. Even in such a case, the light controller adjusts intensity or light emission intervals of measurement light in accordance with reflected light from the reference reflection member 60 for amplitude adjustment. There is thus no need to additionally provide any reference reflection member dedicated to adjustment of light quantity.

For example, it is possible to obtain a swing angle of the movable unit 3 from the amplitude and the phase of the movable unit 3 as calculated in accordance with a signal from the encoder for detecting reflected light from the reference reflection member 60 and the rotational phase of the motor M, so as to control light emission timing of laser light in accordance with the swing angle thus obtained.

By keeping constant the rotation speed of the motor M and the light emission intervals, the density of laser light is increased at around the maximum amplitude of the movable unit 3. In other words, it may be difficult in some cases to satisfy the safety standards for laser light at around the maximum amplitude of the movable unit 3. Even in such a case, by controlling to prolong the light emission interval of the laser diode at around the maximum amplitude, it is possible to secure the safety standards for laser light. The timing of the maximum amplitude can be obtained with reference to the intermediate time points in the white level section and the black level section of a reflection signal for the reference reflection member 60.

If the reference reflection member 60 is provided with reflection regions having shaded stripes along the second axis P2 or differently shaded stripe reflection regions along the rotation of the motor M, it is possible to obtain distance operation characteristics for the case of variation in intensity of reflected light from the respective reflection regions of the reference reflection member 60. It is thus possible to configure a correction circuit for correcting a calculated distance corresponding to reflected light, from an object through the optical window 12, in accordance with the distance operation characteristics.

Upon determination of detection timing of reflected light in accordance with output from the comparator or the like for binarizing a rise of a reflection signal photoelectrically converted by the light emitter/receiver, even with an object located at a same position, an error is corrected, which is generated due to a difference in detection timing of reflected light depending on light quantity of the reflected light.

The signal processing unit 70 preferably includes a synchronization controller for adjusting a rotation cycle of the second deflection mechanism 40 and/or a measurement cycle (more particularly, light emission timing of measurement light (laser diode)) of reflected light with respect to measurement light emitted from the light emitter/receiver 20, in synchronization with the swing cycle of the movable unit 3.

The synchronization controller adjusts the rotation number or the rotational phase of the motor M and the lighting timing of measurement light so as to emit the measurement light in a predetermined measurement direction, in synchronization with the swing phase of the movable unit 3 as described above.

The signal processing unit 70 includes the distance measurement operation unit for calculating a distance to a position (object) from which measurement light is reflected, with reference to the emission timing of the measurement light from the light source provided at the light emitter/receiver 20, from the time difference and the phase difference with reflected light detected afterwards. For example, the distance measurement operation unit according to the TOF system calculates a distance to an object by controlling to light the light source at predetermined cycles, and specifies coordinates of the objects from the distance thus calculated and the emission direction of the measurement light.

However, when the swing cycle of the movable unit 3 is varied by the amplitude controller 72, it is asynchronized with the rotation cycle or the phase of the motor M, and the emission timing of measurement light. It is thus difficult to perform distance measurement in correspondence with the predetermined measurement direction.

More specifically, in a state where the rotation speed of the motor M and the lighting cycle of the light source are kept constant, if the swing cycle of the movable unit is varied in order to control the amplitude of the movable unit 3 to be constant, the measurement direction may be varied, thereby failing to obtain a measurement value in correspondence with the originally needed measurement direction. Furthermore, the number of the necessary measurement points may be increased or decreased within one swing cycle of the movable unit 3.

Even in such a case, the synchronization controller controls the rotation speed or the rotational phase of the motor M as well as controls the light emission timing of the light source so as to be in synchronization with the cycle and the swing phase of the movable unit 3. It is therefore possible to obtain a measurement value in correspondence with the originally needed measurement direction.

As shown in FIG. 10A, the amplitude is maximized at the timing of the midpoint of the white level section T12 and at the timing of the midpoint of the black level section T11 detected by the amplitude detector 71. By counting the elapsed time from the start timing of the white level section T12 and/or the start timing of the black level timing T11, it is possible to determine the timing to reach the midpoint of each of the sections.

More specifically, it is possible to determine the timing of the midpoint of the black level section T11 as the timing of the phase of $\pi/2$, and the timing of the midpoint of the white level section T12 as the timing of the phase of $3\pi/2$. Furthermore, it is possible to determine the timing of the phase zero by returning by a $(1/4)\times T1$ time length from the timing of the phase $\pi/2$.

The synchronization controller controls the rotation speed and the phase of the motor in accordance with the swing phase of the movable unit 3, and controls to light the light emitter at synchronization timing corresponding to a predetermined swing phase. Therefore, even when the swing cycle of the movable unit 3 is varied, measurement light used for distance measurement is lighted constantly in correspondence with the predetermined swing phase so as to enable a distance measuring operation. Exemplified below is synchronization only between the movable unit 3 and the lighting timing of the light emitter.

Figure 11A:
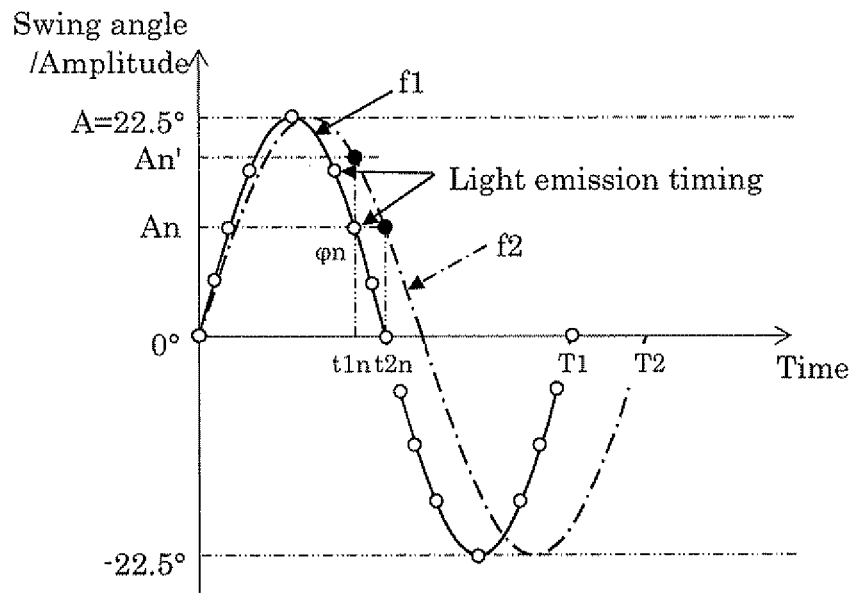
FIG. 11A is an explanatory view of distance measurement timing upon controlling light emission at equal intervals relative to a swing angle direction, and control on distance measurement timing upon variation in frequency.

As shown in FIG. 11A, assume that the phase is $\phi n$ when it is necessary to perform distance measurement with the movable unit 3 swinging at the frequency f1 in the direction of a swing angle An, the distance measurement may be performed at a phase angle satisfying $An=A\times\sin(\phi n)$. At the frequency f1, the timing t1n is expressed as $$t1n=(\phi n/2\pi)\times T1$$

and distance measurement may be performed at this timing.

When the resonant frequency is varied and the movable unit 3 is swung at the frequency f2, if distance measurement is performed at the same timing t1n, the measurement light is directed in the direction of a swing angle An', thereby failing to achieve distance measurement in an intended direction.

The phase $\phi n$ for distance measurement is identical also in this case, measurement timing t2n for the frequency f2 is obtained by $$t2n=(\phi n/2\pi)\times T2$$

In this manner, in accordance with the timing at the phase zero and the time length of one cycle of the movable unit 3, it is possible to calculate the timing t1n in correspondence with the phase $\phi n$ at the frequency f1 so as to control to light measurement light. Even in a case where the frequency is varied to f2, by controlling to light measurement light at the timing t2n corresponding to the phase $\phi n$, it is possible to achieve distance measurement at the predetermined phase $\phi n$ and the swing angle An.

More specifically, when the amplitude controller 72 controls to the frequency f2, the swing angle of the movable unit 3 is varied to An'. In this case, if a synchronization signal output unit outputs a synchronization signal at the timing t2n where the movable unit 3 has the phase $\phi n$, measurement light can be lighted at the timing t2n where the movable unit 3 has the swing angle An.

Figure 11B:
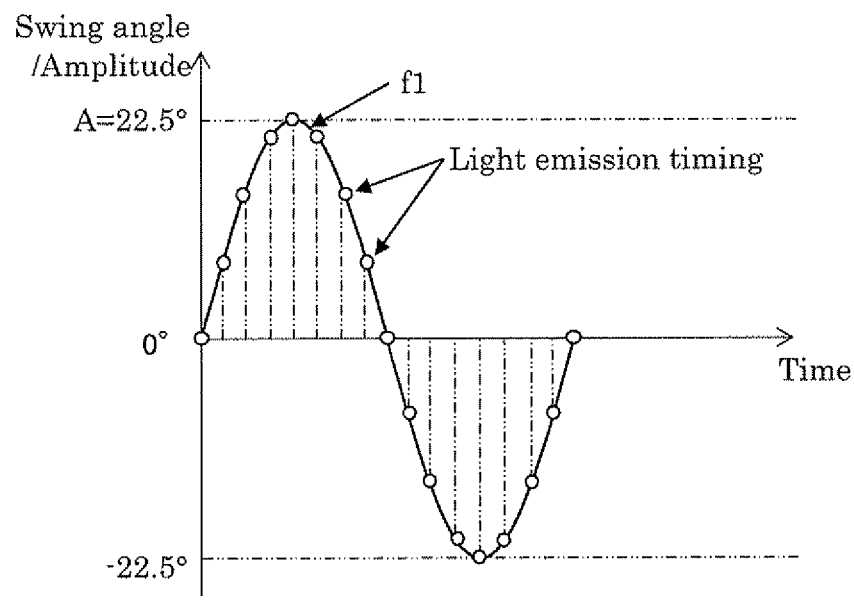
FIG. 11B is an explanatory view of control on distance measurement timing upon controlling light emission at equal intervals relative to a phase direction.

FIG. 11A is a graph indicating distance measurement timing upon controlling light emission at equal intervals in the swing angle direction or the scanning direction. FIG. 11B is a graph indicating distance measurement timing upon controlling light emission at equal intervals in the phase direction or on a temporal axis.

It is appropriately determined depending on a purpose, whether or not to control light emission at which phase or timing, with no limitation to this example. The light emission timing may be preset in a storage device provided in a control device, as phase information or information corresponding thereto for light emission. Alternatively, the timing may be inputted from an external control device or the like.

Described below are different embodiments of the present invention.

The above embodiment exemplifies the configuration of the direct driving type, in which an alternating signal of a frequency identical with that of a signal applied to the coil C is applied to the first coil 52 by way of the contactless power supply unit 50 as a power supply signal, and the power supply signal electromagnetically induced by the second coil 54 is applied to the coil C.

In this case, applied to the first coil 52 by way of the contactless power supply unit 50 are drive signals of frequencies of 200 to 400 Hz, for example. This type simplifies the circuit configuration. However, such low frequencies increase the size of the contactless power supply unit 50 inclusive of the coil support units 51 and 53.

Furthermore, in a case where a control signal of a different type needs to be transmitted between the signal processing unit 70 and the first deflection mechanism 30, it is necessary to provide another contactless power supply unit compatible with such a control signal.

In a case where the drive unit incorporated in the first deflection mechanism 30 is provided with the coil C formed at the movable unit 3 and the power supply circuit for generating current to be applied to the coil C, and the amplitude controller 72 transmits to the drive unit frequency control information on the current to be applied to the coil C by way of the contactless power supply unit 50, by superposing the information on a high frequency current of contactless power supply unit, it is possible to transmit signals of a plurality of types by way of the single contactless power supply unit 50.

For example, it is possible to supply power to the second coil 54 at a frequency as high as 13 MHz or the like by way of the contactless power supply unit 50, and generate constant voltage by smoothing with use of the power supply circuit included in the first deflection mechanism 30, so as to perform various control such as control on amplitude of the drive unit with use of the supplied power. In this case, the power supply circuit may be provided with a frequency adjustment circuit for controlling a frequency of current applied to the coil C in accordance with the frequency control information thus received.

As an aspect of transmitting frequency control information, it is possible to adopt an aspect of switching a frequency upon supply of power to the second coil 54. For example, by switching between the two frequencies of 13 MHz and 13.5 MHz in correspondence with logical values 0 and 1, it is possible to transmit the frequency control information as a digital signal. 112. Alternatively, the frequency supplied to the second coil 54 may be used as a carrier wave, which can be modulated in accordance with the frequency control information, and the frequency control information can be demodulated at a receiver unit.

By adopting such a configuration, while the circuits incorporated in the first deflection mechanism 30 are complicated to some extent, it is possible to reduce the size of the contactless power supply unit 50 by supplying power with a high frequency signal. If a stabilizing power supply circuit is provided as a power supply circuit, it is possible to independently control the movable unit 3 in the first deflection mechanism 30. It is also possible to provide a sensor for detecting swing amplitude of the movable unit 3 so as to independently control the amplitude in accordance with output from the sensor.

Figure 12A:
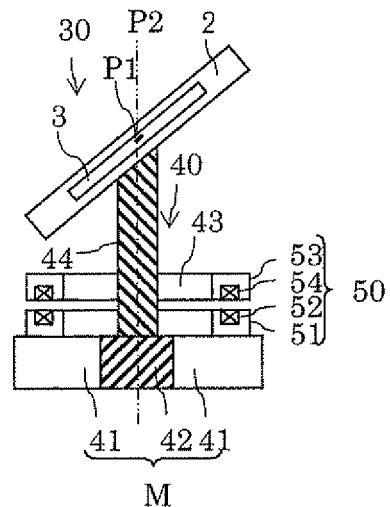
FIGS. 12A, 12B, and 12C are explanatory views showing configurations of a first deflection mechanism and a contactless power supply unit according to another embodiment of the present invention.
Figure 12B:
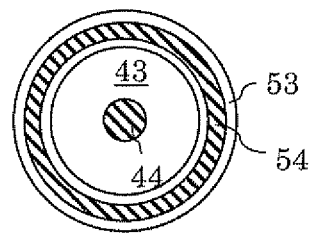
Figure 12C:
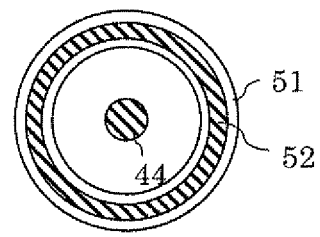

The embodiment described above exemplifies the case of using the motor M of the inner rotor type and the first coil located around the stator. Alternatively, as shown in FIGS. 12A to 12C, the motor M of the inner rotor type may be used, the contactless power supply unit 50 may be located on the upper end surface of the stator 41, and the rotary shaft 44 coupled with the rotor 42 may support the first deflection mechanism 30.

Figure 13A:
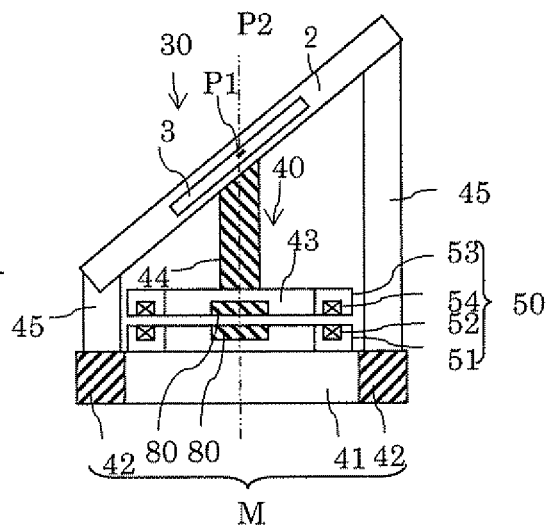
FIGS. 13A, 13B, and 13C are explanatory views showing configurations of a first deflection mechanism and a contactless power supply unit according to still another embodiment of the present invention.
Figure 13B:
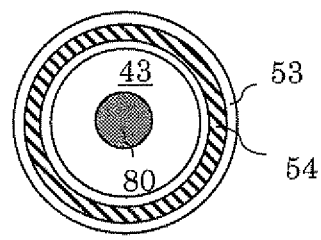
Figure 13C:
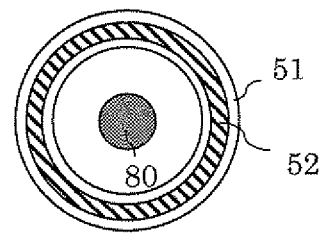

As shown in FIGS. 13A, 13B, and 130, still alternatively, the motor M of the outer rotor type may be used, the first deflection mechanism 30 may be supported by the support unit 45 coupled with the rotor 42, and the contactless power supply unit 50 similar to the above case may be located on the upper end surface of the stator 41.

In this case, it is possible to provide a contactless signal transmission unit 80 for transmitting/receiving signals to/from the first deflection mechanism 30, in a space formed at the center portions of the coil support units 51 and 53. The contactless signal transmission unit 80 can be an optical coupler, an electrostatic induction circuit, a wireless transmission circuit, or the like. In this manner, it is possible to supply power to the first deflection mechanism 30 by way of the contactless power supply unit 50, and transmit a plurality of control signals between the signal processing unit 70 and the first deflection mechanism 30 by way of the contactless signal transmission unit 80.

For example, the signal processing unit 70 can supply power to the first deflection mechanism 30 by way of the contactless power supply unit 50, receives a signal of a swing amplitude sensor provided at the first deflection mechanism 30 by way of the contactless signal transmission unit 80, and transmits frequency information used for control on swing amplitude, to the power supply circuit provided at the first deflection mechanism 30 by way of the contactless signal transmission unit 80.

Figure 14:
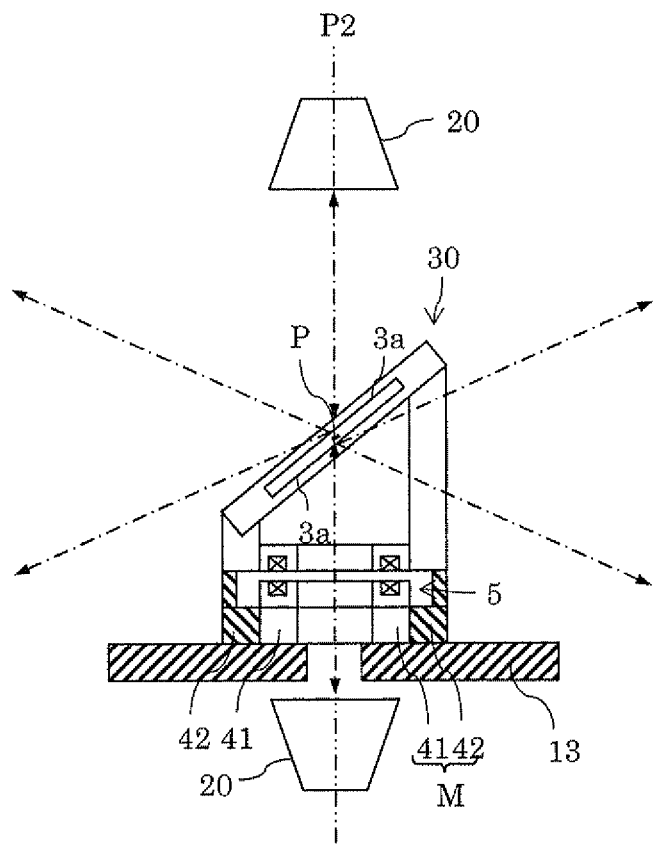
FIG. 14 is an explanatory view showing configurations of a light emitter/receiver, a first deflection mechanism, and a contactless power supply unit according to further another embodiment of the present invention.

As shown in FIG. 14, the motor M of the outer rotor type may be used, and the first deflection mechanism 30 may be supported by the support unit 45 coupled with the rotor 42.

Furthermore, when the contactless power supply unit 50 similar to the above case is located on the upper end surface of the stator 41, the stator 41 may be formed to be hollowed. Moreover, the deflecting mirrors 3a may be provided on both the upper and lower surfaces of the movable unit 3, and an optical path may be formed in the hollow portions in the stator 41 and the contactless power supply unit 50. By locating the light emitter/receivers 20 above and below along the second axis P2, it is possible to achieve simultaneous distance measurement in two directions.

Figure 15:
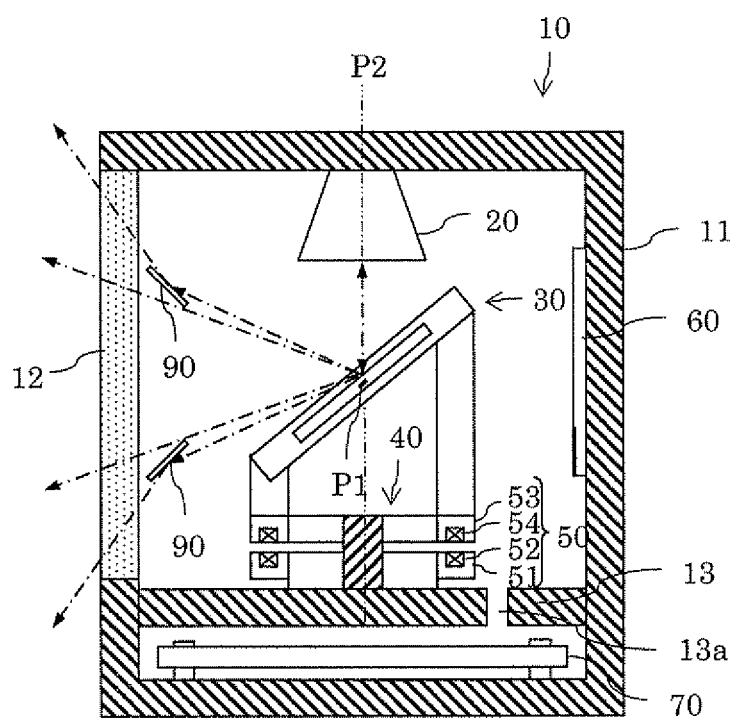
FIG. 15 is a sectional view of a deflector according to a different embodiment of the present invention.

As shown in FIG. 15, if a secondary deflection plate 90 is provided partially at each or one of upper and lower edges of measurement light deflected and reflected by the deflecting mirror 3a, it is possible to expand a distance measurement range in a region provided with the secondary deflection plate 90. By providing to a crane truck, an AGV that travels on uneven surfaces, or the like, it is possible to detect the height of a ceiling or unevenness on a floor, while scanning the periphery. For example, it is possible to provide the secondary deflection plate 90 in the range of ±2.5° around the front direction.

The above embodiments each exemplify the case where the stopped deflecting mirror 3a is set to be inclined at 45° from the horizontal plane. Alternatively, the deflecting mirror 3a may be set to be inclined at more than or less than 45° from the horizontal plane. The inclination angle thereof may be set appropriately depending on the region to be measured. Still alternatively, the second deflection mechanism 40 may be provided with a motor for automatically changing the angle of the first deflection mechanism 30.

The above embodiments each adopt the first deflection mechanism 30 of the type of swinging the movable unit 3 with use of Lorentz force. Alternatively, the first deflection mechanism 30 may swing the movable unit 3 with use of electrostatic force generated by applying alternating current to a coil, or piezoelectric force generated by applying voltage to beams 4 each made of a piezoelectric body. Still alternatively, an elastic beam may be provided only at one end of the movable unit, and the movable unit may be driven to swing about the beam.

The above embodiments describe the scanning distance measuring equipment including the deflector according to the present invention. However, the deflector is not limited in terms of the purpose of use. For example, the deflector may be applied to an optical scanner for scanning image light emitted from a projector or the like.

What is claimed is:
1. A deflector comprising:
 a first deflection mechanism including a movable unit swingable about a first axis and a drive unit that swings the movable unit;
 a second deflection mechanism that rotates the first deflection mechanism about a second axis different from the first axis;
 a contactless power supply unit including a second coil that is electrically connected to the drive unit and is located to rotate about the second axis along with the rotating second deflection mechanism, and a first coil that is located to face the second coil on a common axis, the contactless power supply unit for supplying power from the first coil to the second coil in accordance with an electromagnetic induction system;
 a light emitter/receiver located on the second axis;
 a light deflecting unit provided at the movable unit, that deflects and reflects measurement light emitted from the light emitter/receiver along the second axis and guides, to the light emitter/receiver, light reflected by an object out of the measurement light thus deflected and reflected;
a reference reflection member comprising regions of different reflectance along the second axis, and being irradiated with the measurement light emitted from the light emitter/receiver and deflected and reflected by the light deflecting unit; and
a swing controller that includes an amplitude detector that detects swing amplitude by the first deflection mechanism in accordance with the reflected light from the reference reflection member and received by the light emitter/receiver, and an amplitude controller that controls the drive unit such that the swing amplitude detected by the amplitude detector has a predetermined value.

2. The deflector according to claim 1, wherein
the first deflection mechanism includes a fixed unit rotatably supported by the second deflection mechanism, and a beam with which the movable unit is supported by the fixed unit, and
the beam is driven by the drive unit to twist rotate or warp swing, and serves as the first axis.

3. The deflector according to claim 2, wherein
the drive unit includes a driving coil provided at the movable unit, and the amplitude controller controls a current applied to the coil by way of the contactless signal transmission unit that transmits/receives a signal from/to the first deflection mechanism.

4. The deflector according to claim 2, wherein
the drive unit includes a driving coil provided at the movable unit, and a power supply circuit that generates current applied to the coil,
the amplitude controller transmits, to the power supply circuit, current control information on current applied to the coil by way of the contactless power supply unit, the current control information being superposed on a high frequency current of contactless power supply unit, and
the power supply circuit controls the frequency of the current applied to the coil in accordance with the current control information.

5. The deflector according to claim 2, further comprising:
a synchronization controller that adjusts a rotation cycle of the second deflection mechanism and/or a measurement cycle of reflected light with respect to measurement light emitted from the light emitter/receiver, in synchronization with a swing cycle of the movable unit.

6. The deflector according to claim 2, further comprising:
a light controller that adjusts intensity or an emission interval of measurement light emitted from the light emitter/receiver, in accordance with the reflected light from the reference reflection member and received by the light emitter/receiver.

7. The deflector according to claim 3, wherein
the contactless power supply unit includes paired coil support units each having a ring shape, supporting the first coil and second coil respectively wound therearound, and the contactless signal transmission unit is provided in a space formed at a center of each of the coil support units.

8. An optical scanner comprising a deflector including:
a first deflection mechanism including a movable unit swingable about a first axis and a drive unit that swings the movable unit;
a second deflection mechanism that rotates the first deflection mechanism about a second axis different from the first axis;
a contactless power supply unit including a second coil that is electrically connected to the drive unit and is located to rotate about the second axis along with the rotating second deflection mechanism, and a first coil that is located to face the second coil on a common axis, the contactless power supply unit supplying power from the first coil to the second coil in accordance with an electromagnetic induction system;
a light emitter/receiver located on the second axis;
a light deflecting unit provided at the movable unit, that deflects and reflects measurement light emitted from the light emitter/receiver along the second axis and guides, to the light emitter/receiver, light reflected by an object out of the measurement light thus deflected and reflected;
a reference reflection member comprising regions of different reflectance along the second axis, and being irradiated with the measurement light emitted from the light emitter/receiver and deflected and reflected by the light deflecting unit; and
a swing controller includes an amplitude detector that detects swing amplitude by the first deflection mechanism in accordance with the reflected light from the reference reflection member and received by the light emitter/receiver, and an amplitude controller that controls the drive unit such that the swing amplitude detected by the amplitude detector has a predetermined value.

9. Scanning distance measuring equipment comprising a deflector including:
a deflector including:
a first deflection mechanism including a movable unit swingable about a first axis and a drive unit that swings the movable unit;
a second deflection mechanism that rotates the first deflection mechanism about a second axis different from the first axis;
a contactless power supply unit including a second coil that is electrically connected to the drive unit and is located to rotate about the second axis along with the rotating second deflection mechanism, and a first coil that is located to face the second coil on a common axis, the contactless power supply unit for supplying power from the first coil to the second coil in accordance with an electromagnetic induction system;
a light emitter/receiver located on the second axis;
a light deflecting unit provided at the movable unit, that deflects and reflects measurement light emitted from the light emitter/receiver along the second axis and guides, to the light emitter/receiver, light reflected by an object out of the measurement light thus deflected and reflected;
a reference reflection member comprising regions of different reflectance along the second axis, and being irradiated with the measurement light emitted from the light emitter/receiver and deflected and reflected by the light deflecting unit; and
a swing controller includes an amplitude detector that detects swing amplitude by the first deflection mechanism in accordance with the reflected light from the reference reflection member and received by the light emitter/receiver, and an amplitude controller that controls the drive unit such that the swing amplitude detected by the amplitude detector has a predetermined value.

* * * * *